United States Patent
Allen et al.

(10) Patent No.: US 10,578,449 B2
(45) Date of Patent: Mar. 3, 2020

(54) WAYPOINT NAVIGATOR

(71) Applicant: ENT. SERVICES DEVELOPMENT CORPORATION LP, Houston, TX (US)

(72) Inventors: William J. Allen, Corvallis, OR (US); Charles Edgar Bess, Frisco, TX (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 0 days.

(21) Appl. No.: 15/305,199

(22) PCT Filed: Jun. 2, 2014

(86) PCT No.: PCT/US2014/040512
§ 371 (c)(1),
(2) Date: Oct. 19, 2016

(87) PCT Pub. No.: WO2015/187124
PCT Pub. Date: Dec. 10, 2015

(65) Prior Publication Data
US 2017/0074672 A1  Mar. 16, 2017

(51) Int. Cl.
*G01C 21/36* (2006.01)
*G01C 21/34* (2006.01)

(52) U.S. Cl.
CPC ..... *G01C 21/3602* (2013.01); *G01C 21/3461* (2013.01); *G01C 21/3611* (2013.01);
(Continued)

(58) Field of Classification Search
CPC ............ G01C 21/3602; G01C 21/3632; G01C 21/3611; G01C 21/3614; G01C 21/3461;
(Continued)

(56) References Cited

U.S. PATENT DOCUMENTS

| 7,831,387 B2 * | 11/2010 | Golding | G01C 21/3602 340/995.24 |
| 8,131,118 B1 | 3/2012 | Jing et al. | |

(Continued)

FOREIGN PATENT DOCUMENTS

| KR | 10-2009-0030797 A | 3/2009 |
| KR | 10-2010-0132761 A | 12/2010 |

(Continued)

OTHER PUBLICATIONS

PCT Search Report/Written Opinion ~ Application No. PCT/US2014/040512 dated Feb. 25, 2015 13 pages.
(Continued)

*Primary Examiner* — Mary Cheung
(74) *Attorney, Agent, or Firm* — Sheppard Mullin Richter & Hampton LLP

(57) ABSTRACT

An example waypoint navigator method includes identifying a local waypoint using image recognition on an image of the local waypoint displayed on a mobile device. The example method also includes overlaying on the image of the local waypoint, a visual direction to the remote waypoint based on identifying the local waypoint, the visual direction based on context. The example method also includes updating the visual direction based on changes in the context.

20 Claims, 11 Drawing Sheets

(52) U.S. Cl.
CPC ..... *G01C 21/3614* (2013.01); *G01C 21/3632* (2013.01); *G01C 21/3679* (2013.01); *G01C 21/3691* (2013.01)

(58) Field of Classification Search
CPC ............ G01C 21/3679; G01C 21/3605; G01C 21/3691
See application file for complete search history.

(56) References Cited

U.S. PATENT DOCUMENTS

| | | | |
|---|---|---|---|
| 2007/0069923 A1* | 3/2007 | Mendelson | G01C 21/206 340/988 |
| 2010/0250126 A1* | 9/2010 | Epshtein | G01C 21/3602 701/438 |
| 2011/0216179 A1 | 9/2011 | Dialameh et al. | |
| 2011/0246064 A1 | 10/2011 | Nicholson et al. | |
| 2011/0288684 A1 | 11/2011 | Farlow et al. | |
| 2012/0224060 A1 | 9/2012 | Gurevich et al. | |
| 2013/0013414 A1* | 1/2013 | Haff | G06Q 30/0241 705/14.64 |
| 2013/0035853 A1* | 2/2013 | Stout | G06L 17/05 701/438 |
| 2013/0345981 A1* | 12/2013 | van Os | G01C 21/3626 701/540 |

FOREIGN PATENT DOCUMENTS

| | | |
|---|---|---|
| KR | 10-2011-0106122 A | 9/2011 |
| KR | 10-2013-0137064 A | 12/2013 |

OTHER PUBLICATIONS

Schrom-Feierta, H. et al.; "Creating and Sharing Personal Geo-referenced Memories and Experiences in a Mobile Community"; May 15, 2011; 24 pages.

\* cited by examiner

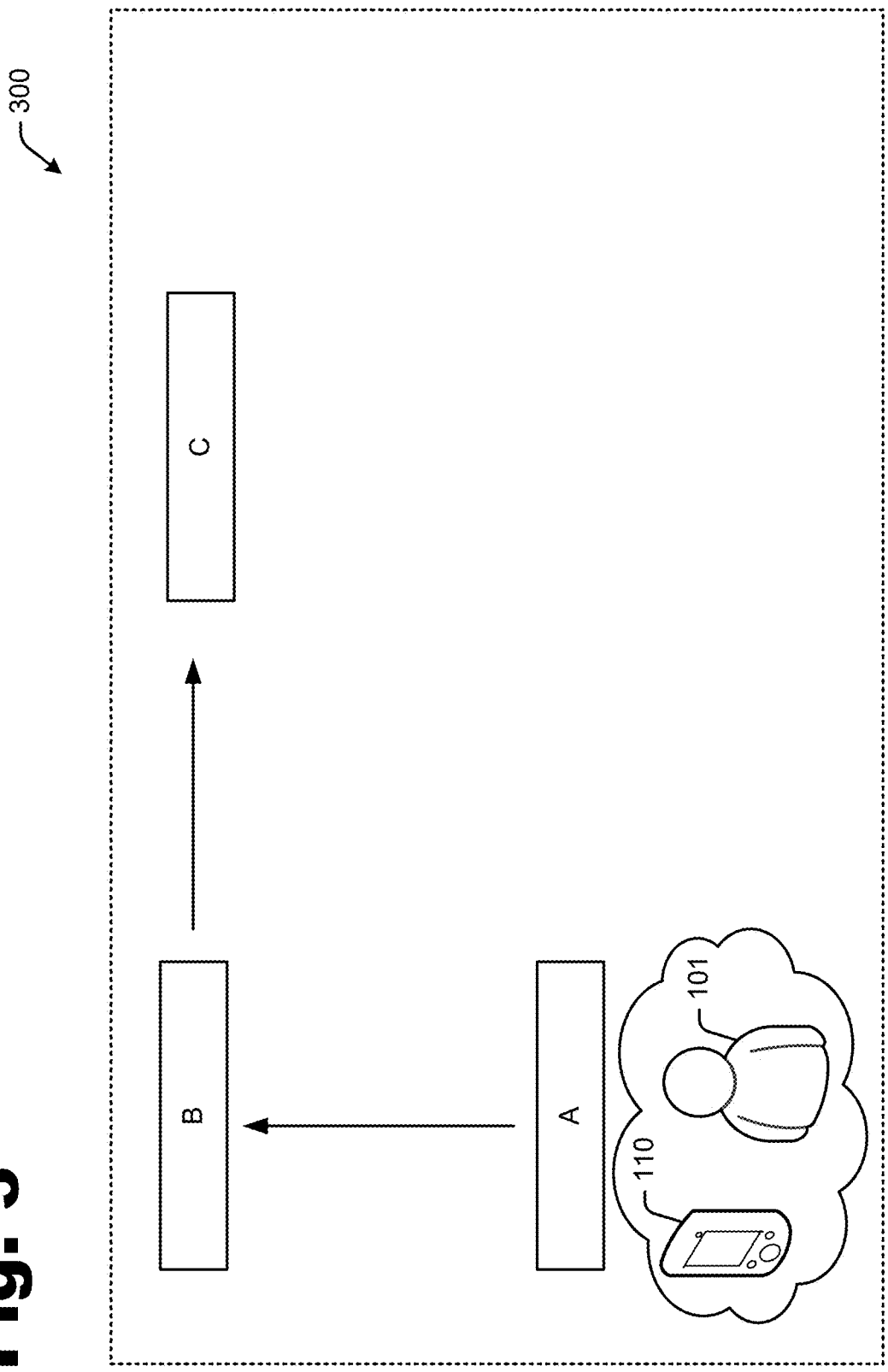

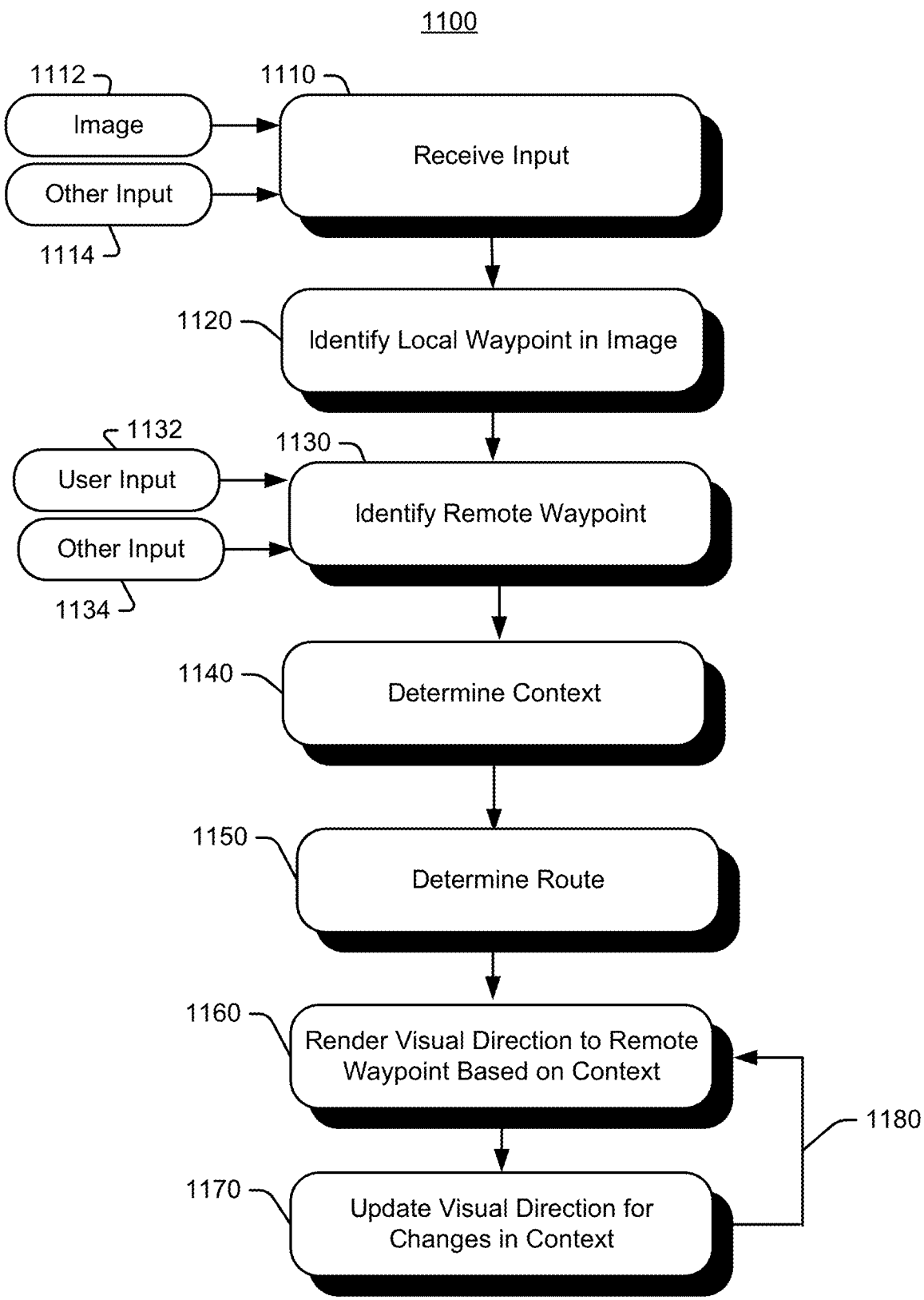

WAYPOINT NAVIGATOR

CLAIM FOR PRIORITY

The present application is a national stage filing under 35 U.S.C. § 371 of PCT application number PCT/US2014/040512, having an international filing date of Jun. 2, 2014, the disclosure of which is hereby incorporated by reference in its entirety.

BACKGROUND

Navigation is broadly defined as the process of assisting movement between a starting position and a destination. Navigation includes the movement of vehicles (e.g., land-based, air-based, and water-based vehicles) and pedestrians. Early navigation relied on the stars (e.g., the North Star) and other natural landmarks. Even today, people may use natural and/or man-made landmarks to navigate (e.g., "go toward the mountains" or "go past the gas station on your left"). Instruments (e.g., the compass) have long been used to assist in navigation. More recently, the development of global positioning system (GPS) devices, and even map applications available on most newer mobile devices (e.g., smart phones and tablets), have made it easier to navigate.

BRIEF DESCRIPTION OF THE DRAWINGS

FIG. 3 is an illustration showing an example of waypoint navigation.

FIGS. 10-11 are flowcharts illustrating example operations which may implement waypoint navigation.

DETAILED DESCRIPTION

Figure 1:
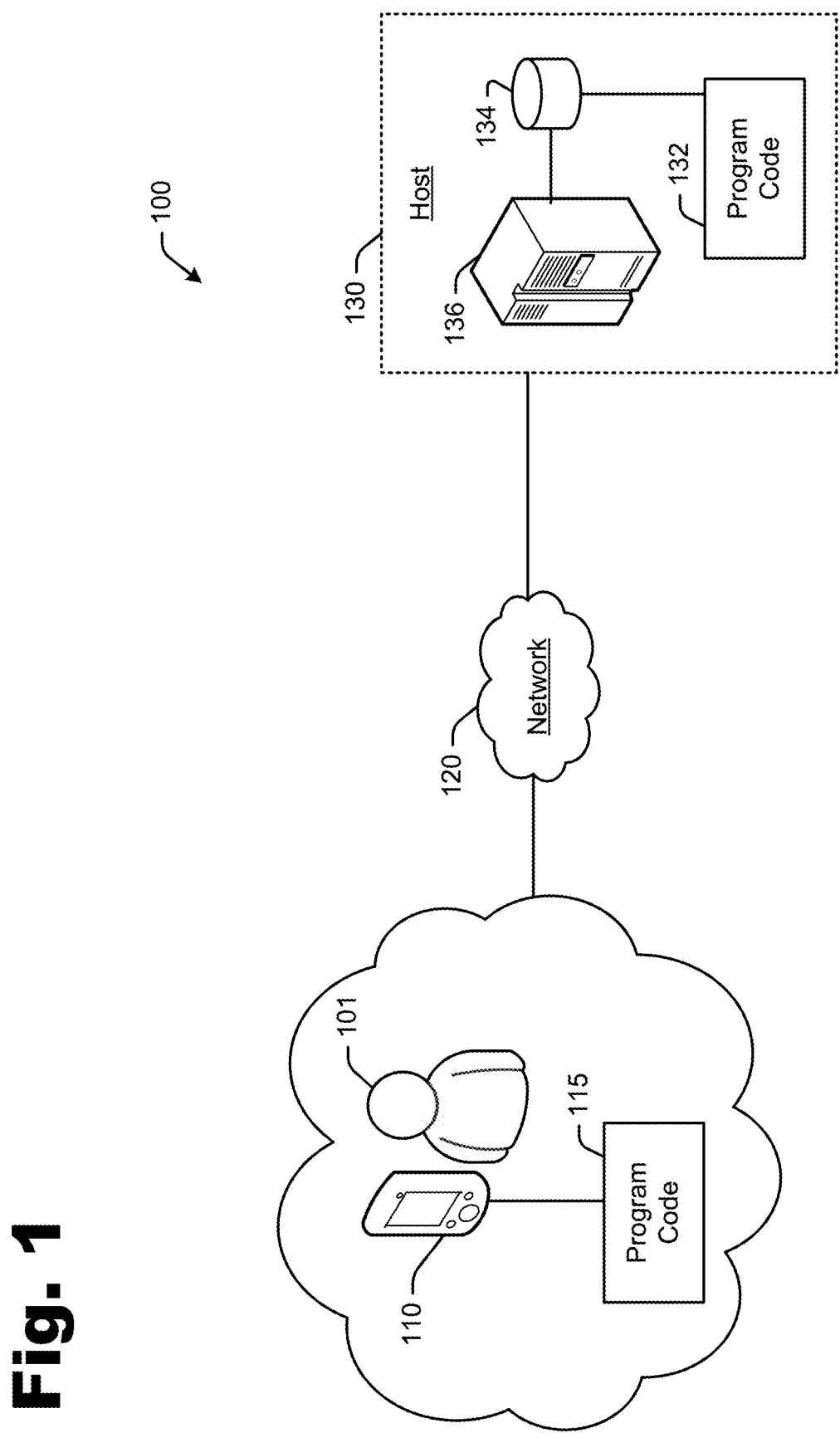
FIG. 1 is a high-level block diagram of an example networked computer system which may be implemented for waypoint navigation.

Mapping applications rely on the user manually inputting an address and/or signal-based technology (e.g., radio frequency (RF), wide area network (WiFi), or GPS) to locate a user's mobile device, and hence the proximity of the user. This position can then be used to display a map of the user's vicinity. The map may include a highlighted route to the desired destination. However, it is natural for the user to follow the map by staring at the map displayed on the user's mobile device while moving (e.g., walk, drive, bike, or otherwise), and can result in the user bumping into other people or objects.

A waypoint navigator and method is disclosed. An example waypoint navigator and method can be used independent of existing location technology (e.g., without need for a GPS, RF, WiFi, or other signal). As such, the user can still navigate using the waypoint navigator and method even when other location technologies are not available. For example, the waypoint navigator and method can still be used inside facilities even without access to a GPS signal. Likewise, the waypoint navigator and method can still be used when moving between areas not covered by shorter range RF and WiFi networks. In addition, the user does not have to continually look at the display on his or her mobile device while moving between points. In an example, the user is even discouraged from looking at their display while moving.

An example waypoint navigator method includes identifying a local waypoint using image recognition on an image of the local waypoint displayed on a mobile device. The example method also includes overlaying on the image of the local waypoint, a visual direction to a remote waypoint based on identifying the local waypoint. In an example, the visual direction is a vector (a direction and a magnitude or distance). In an example, a visual indicator of the remote waypoint is overlaid on the image of the local waypoint, along with the visual direction to the remote waypoint. The visual direction is based on context of the image of the local waypoint. The example method also includes updating the visual direction based on changes in the context of the image of the local waypoint.

An example of the waypoint navigator is implemented on a device having program code stored on a non-transitory computer-readable medium and executable by a processing. The example waypoint navigator includes image recognition program code to identify a local waypoint in an image. The example waypoint navigator also includes rendering program code to overlay a visual direction to a remote way point on an image of the local waypoint based on context of the local way point in the image, and updating the visual direction based on changes in the context of the local way point in the image.

An example of the waypoint navigator is a system including program code stored on a non-transitory computer-readable medium. The program code is executable by a processor to identify a local waypoint in an image. The program code is also executable to render a visual direction to a remote way point on an image of the local waypoint based on context of the local way point in the image. The program code is further executable to update the visual direction based on changes in the context of the local way point in the image.

The waypoint navigator may be implemented for multiple waypoints along a path. For example, the waypoint navigator may dynamically determine at least one waypoint of interest (e.g., "points of interest") en-route to a target waypoint based on user input and/or preferences. By way of illustration, a user may be selecting artwork waypoints of a particular genre at an art museum. Accordingly, the waypoint navigator may suggest other waypoints for the user to visit along the path toward the selected target waypoint.

In addition, the waypoint navigator may display at least one route option. To illustrate, the waypoint navigator may enable the user to select from a menu of dining options between waypoints. As another illustration, the waypoint navigator may enable the user to select a target waypoint (e.g., airport terminal) from various icons shown on the display (e.g., further including dining, restrooms, baggage, and ground transportation). Still other examples are contemplated.

In an example, the visual direction to the remote waypoint may be removed from the display as the user moves between the local waypoint and the remote waypoint. As such, the user is less likely to continue looking at the device, and instead focus on the physical surroundings where he or she is moving. In an example, the user may request to re-display the visual direction to the remote waypoint when the user is between the local waypoint and the remote waypoint, e.g., as a reminder.

In an example, an indicator may be displayed as part of, or in addition to, the visual direction. The indicator may indicate to the user at least one condition between the local waypoint and the remote waypoint. As an example, the indicator may be a color of the visual direction. To illustrate, a red arrow may indicate a long distance, a yellow arrow may indicate a medium distance, and a green arrow may indicate a short distance. The definition of "long," "medium," and "short" may be predefined (e.g., based on generally accepted standards for the mode of transportation) and/or defined based on user input (e.g., user age or what the user considers to be a long, medium, and short distance). The indicator may be any suitable output, including for example a symbol (e.g., a graphical icon of the sun to indicate at least part of the route is outdoors).

In an example, the waypoint navigator implements dynamic routing. The term "dynamic routing" is used herein to include receiving input at the device of at least one condition to include and/or exclude between the local waypoint and the remote waypoint. Examples of conditions include but are not limited to, avoid stairs, use handicap accessible paths.

Before continuing, it is noted that as used herein, the terms "includes" and "including" mean, but is not limited to, "includes" or "including" and "includes at least" or "including at least." The term "based on" means "based on" and "based at least in part on."

FIG. 1 is a high-level block diagram of an example networked computer system which may be implemented for waypoint navigation. System 100 may be implemented with any of a wide variety of computing devices, such as the mobile phone 110 shown in the drawing. Other example computing devices may include, but are not limited to, tablet devices and appliances (e.g., so-called "smart" watches or "smart" glasses), to name only a few examples. Of course, any suitable computing device may be utilized, such as a laptop computer, although it will be understood that the waypoint navigator described herein may have greater applicability to mobile devices due to the nature of navigation. Mobile devices may be handheld (e.g., the mobile phone 110) or mounted to a vehicle (e.g., an in-vehicle navigation system).

The computing device (e.g., mobile device 110) may include memory, storage, and a degree of data processing capability at least sufficient to execute the program code 115 to implement the waypoint navigator described herein. It is noted that the program code 115 may be a stand-alone application (e.g., a so-called "app" for a mobile phone) and/or may be at least partly integrated with program code executing remotely (e.g., on host system 130).

The computing device (e.g., mobile device 110) may also include sufficient processing capability to manage a communications connection either directly with one another or indirectly (e.g., via network 120). It is noted, however, that the communications connection need not be a full-time connection, and the computing devices may execute the program code 115 described herein to implement the waypoint navigator as a stand-alone application.

In an example, the computing device (e.g., mobile device 110) may connect via the network 120 to the host system 130 providing a navigation and/or navigation-extended service implemented as program code 132 stored on a computer-readable medium 134 and executed by a host computer 136 (e.g., a server computer). The service may be accessed by a user 101 of mobile device 110 via the network 120. For purposes of illustration, the service may include an updating service to provide the mobile device 110 with program code updates and/or updates to the waypoints (e.g., when a waypoint is added, changed, or removed). For purposes of illustration, the service may also provide so-called "extended" services, for example, wherein the user's location is correlated to other user locations as described more fully below, or various user options described more fully below. For purposes of illustration, the service may also be implemented as a dynamic service to dynamically (or "on-the-go") provide the user with relevant waypoints (e.g., waypoints for a particular retail establishment when the user is in the vicinity of the retail location). In an example, the service may also provide the user with pre-selected waypoints (e.g., a guided tour that the user has selected in advance of visiting a city such as the historic parts of Boston).

The mobile device 110 and/or the host system 130 may access at least one remote source of data (not shown). That is, the source may be physically distributed in the network and operatively associated with the mobile device 110 and/or the host system 130. The source may include any data. For example, the source may include databases for gathering information from the user(s) and/or providing information to the user(s). The data may include metadata (i.e., data about data) such as, but not limited to, a user's location and/or other users' locations (e.g., at a particular time), and user preferences (e.g., the use of handicap routes/facilities). Appropriate permissions and protections may be put in place for data gathering, processing, and distribution. This information may be utilized to enhance the service(s) offered to the user 101. There is no limit to the type or amount of content that may be provided by the source. In addition, the content may include unprocessed or "raw" data, or the content may undergo at least some level of processing.

Program code may be executed by any suitable computing device(s) to implement the waypoint navigator described herein. Program code to implement features of the system can be better understood with reference to FIG. 2 and the following discussion of various example functions. However, the operations described herein are not limited to any specific implementation with any particular type of program code.

Figure 2:
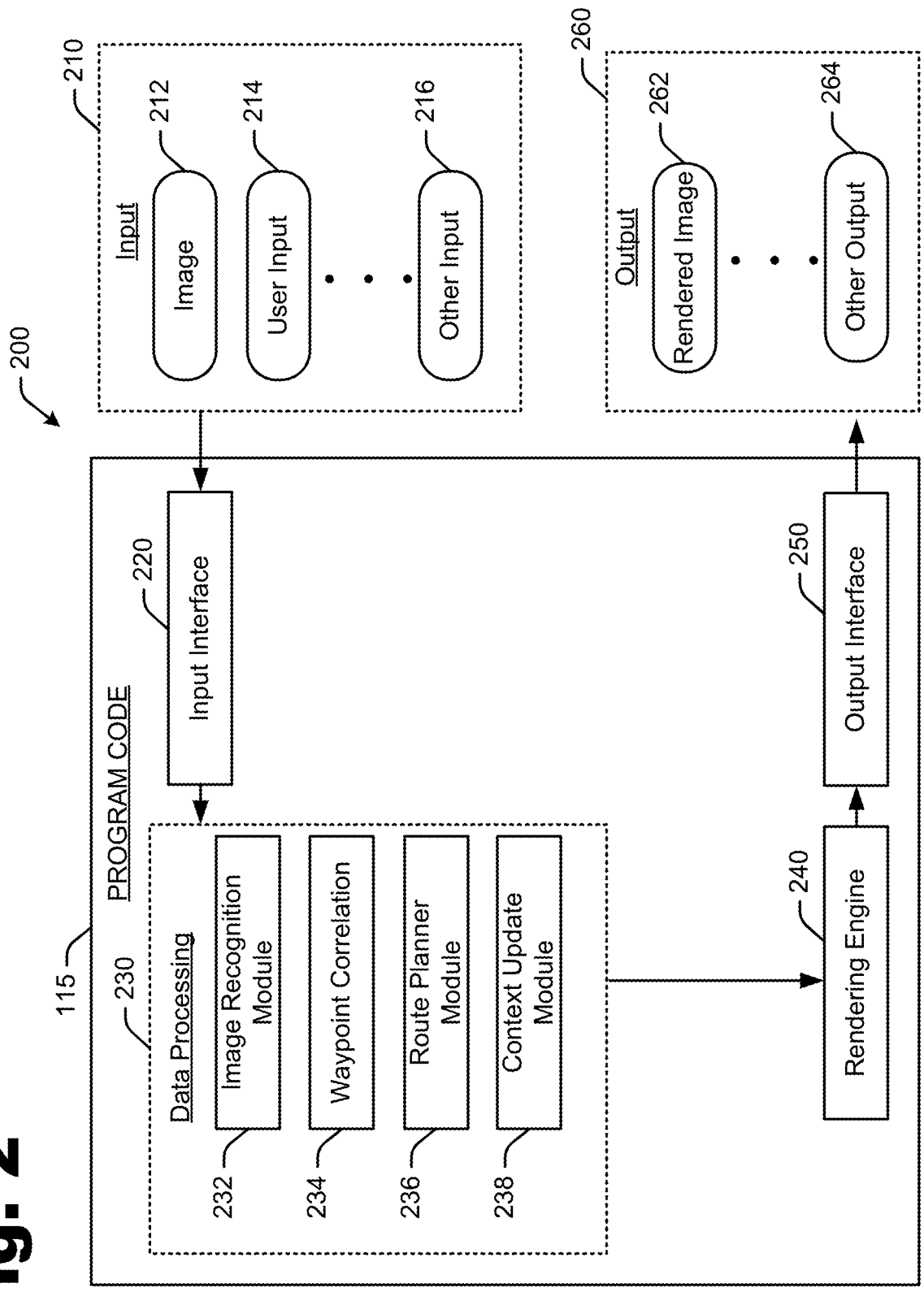
FIG. 2 shows an example architecture of machine readable instructions, which may be executed by a waypoint navigator.

FIG. 2 shows example architecture 200 of machine readable instructions, which may be executed as program code by a waypoint navigator. In an example, the program code may be implemented software and/or firmware. The machine-readable instructions may be stored on a non-transient computer readable medium and are executable by one or more processor to perform the operations described herein. It is noted, however, that the components shown in FIG. 2 are provided only for purposes of illustration of an example operating environment, and are not intended to limit implementation to any particular design.

In an example, the program code 115 may reside on a computing device (e.g., mobile device 110 in FIG. 1) and executes the function of the architecture 200 of machine readable instructions as self-contained modules. These modules can be integrated within a self-standing tool or "app," and/or may be implemented as agents that run on top of an existing application.

The program code 115 may receive input 210 via input interface 220. In an example, the program code 115 may receive an image 212 via a camera on the mobile device 110. The image may be a "live" image (e.g., in preview mode) or a captured image. The image may include at least one view of a waypoint (e.g., a sign or other object) that the user 101 is at or near. The program code 115 may also receive other user input 214. Examples of user input 214 include but are not limited to the name of another waypoint (e.g., the next waypoint, or a target or destination waypoint), a category of waypoints (e.g., local dining), and/or various user preference(s). The program code 115 may also receiver other input 216 (e.g., non-user input). Examples of other input 216 include but are not limited to a user location (e.g., determined via GPS or other locator), user history, and input from other users.

The program code 115 may include data processing modules 230. Data processing modules 230 may include an image recognition module 232 to process the image 212 and identify a local waypoint in the image 212. In an example, a more granular technique may be implemented to improve processing speed and to recognize a waypoint in the image without having to obtain an exact match. Such an implementation may also help improve recognition of waypoints in various lighting, from various angles, and during different seasons. However, the waypoint navigator described herein is not limited to use with any particular type of image recognition techniques.

Data processing modules 230 may also include a waypoint correlation module 234 to correlate the waypoint recognized in the image 212 with an orientation of the user based on context of the image. For example, the waypoint correlation module may recognize that the user is facing the waypoint facing south. This enables the program code 115 to give directions based on the orientation of the user (e.g., by pointing the user to left as opposed to pointing the user to the right if the user were facing north).

Data processing modules 230 may also include a context update module 236 to update directions provided to the user based on context of the waypoint recognized in the image 212. This enables the program code 115 to update the directions based on the orientation of the user if the user moves (e.g., by pointing the user to right instead of to the left when the user has turned from facing south to pointing north), as determined by the context of the waypoint recognized in the image 212. This is an example of updating for "local" context. Waypoint correlation and updating based on local context will be explained in more detail below with reference to FIGS. 4A-C.

Data processing modules 230 may also include a route planner module 238 to plan a route and determine waypoint(s) along that route. Route planner module 238 may take into consideration any of a variety of factors to identify the appropriate route. For example, the route planner module 238 may base the route on time of day, user preferences (e.g., to avoid stairs), where other users are, guide the user to other waypoints that may be of interest, to name only a few examples. These are examples of "remote" context, the program code 115 may update the directions based on changes of a remote waypoint, destination waypoint, and/or changes in route conditions (e.g., congestion). Waypoint correlation and updating based on remote context (e.g., dynamic routing) will be explained in more detail below with reference to FIG. 8.

The program code 115 may also include a rendering engine 240 to overlay a visual direction to a remote way point on the image 212 of the local waypoint. As described above, the visual direction may be overlaid based on context of the local way point in the image (e.g., to point right if the user is facing north, or to point left if the user is facing south). The rendering engine 240 may also update the visual direction based on changes in the context of the local way point in the image (e.g., if the user changes position from facing north to facing south).

In an example, the program code 115 includes an output interface 250 to generate output 260 for the user. In an example, the output includes the rendered image 262. The rendered image may include the visual direction (e.g., at least one of an arrow and a distance, or a vector) and/or an image of the remote waypoint overlaid on the image 212 of the current waypoint. Output may also include, but is not limited to other output 264 such as audio output, user recommendations, a warning to the user to watch his or her physical surroundings and not stare at the device display while moving, to name only a few examples.

The program code 115 may be implemented (in a stand-alone mode and/or in conjunction with other program code such as program code 132 described above with reference to FIG. 1). In addition to the module functions described above, program code 115 may be executed to deliver a wide variety of user experiences.

By way of illustration, the waypoint navigator may further display, along with the visual direction, an indicator of at least one condition between the local waypoint and the remote waypoint. In an example, the indicator of at least one condition may include color (e.g., a green, yellow, or red arrow) and/or symbol (e.g., a graphic icon of the sun indicating travel between waypoints will be outdoors).

In an example, the waypoint navigator may further dynamically determine at least one waypoint of interest en-route to a target waypoint based on user preferences. For example, the waypoint navigator may determine that the user has just had dinner, and suggest a waypoint offering dessert. The program code may be further executable to display at least one route option, such as the question (or icon) "Do you want dessert?".

In an example, the waypoint navigator may further implement dynamic routing, including receiving input at the device of at least one condition to include and/or exclude, between the local waypoint and the remote waypoint. For example, the user may request a route including an elevator. For example, the user may request a route excluding stairs.

FIG. 3 is a high-level illustration 300 showing an example of waypoint navigation. In this illustration, the user 101 desires to navigate from starting position (local waypoint A) via a waypoint B to a target or destination (waypoint C). In this example, waypoint B and waypoint C may be referred to as remote waypoints (i.e., separate and distinct in location from local waypoint A) when the user is at waypoint A. When the user moves to waypoint B, then waypoint B becomes the "local waypoint" and waypoint C is the remote waypoint. If the user returns to waypoint A, then waypoint A may also be considered a remote waypoint.

The user may use the mobile device 110 to capture an image of the local waypoint A. The waypoint may be a building, a statue, or a painting in a museum. The waypoint may be a physical object and/or an image (e.g., a sticker with a graphic adhered to a post or sign). It is noted that the waypoint may be any suitable marker. However, a stationary or at least mostly stationary (e.g., unlikely to be moved) marker may be desirable for consistency. It is noted that a marker may be inappropriate in one situation and appropriate in another situation. An example of such situation-based markers is the use of a vehicle as a marker. A car parked on the street that is likely to be moved when the owner comes out of the local establishment he or she is visiting would not provide a desirable long-term waypoint. However, a car parked in an automobile museum may serve as a good marker for a waypoint. In an example, the waypoint navigator may operate with moving waypoints, wherein the waypoint navigator receives real-time (or substantially real-time) data for a waypoint.

The waypoint navigator may process the image of the waypoint to identify the location and orientation of the user 101. For example, the waypoint navigator may identify a local waypoint using image recognition on the image of the local waypoint captured (and/or displayed) on the mobile device 110. The waypoint navigator may also determine orientation of the user relative to the local waypoint based on view of the local waypoint captured (e.g., front, back, left side, right side, top, bottom). The waypoint navigator may then overlay a visual direction to a remote waypoint (e.g., waypoint B in FIG. 3) on the image of the local waypoint displayed on the mobile device 110.

An example will be discussed below with reference to the illustration in FIGS. 5A-B. For now, it is sufficient to understand that when the user 101 reaches waypoint B, the user may repeat the process for directions to waypoint C. This process may be repeated as often as the user desires. For example, the user may use the waypoint navigator to move between two points, or between many points.

In an example, the visual direction overlaid on the display of the mobile device 110 is based on context of the image of the local waypoint. For example, if the user is facing north, then the direction may include an arrow pointing straight ahead. If the user is facing west, then the direction may include an arrow pointing to the right. That is, the waypoint navigator may update the visual direction displayed for the user based on changes in the context of the image of the local waypoint as described in more detail below with reference to FIGS. 4A-C.

Figure 4A:
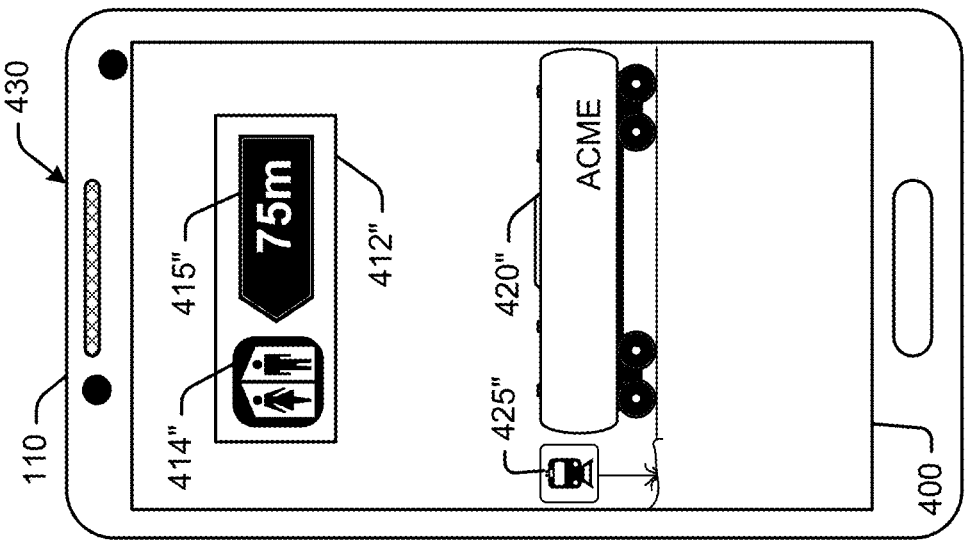
FIGS. 4A-C are example interfaces illustrating output based on context during waypoint navigation.
Figure 4B:
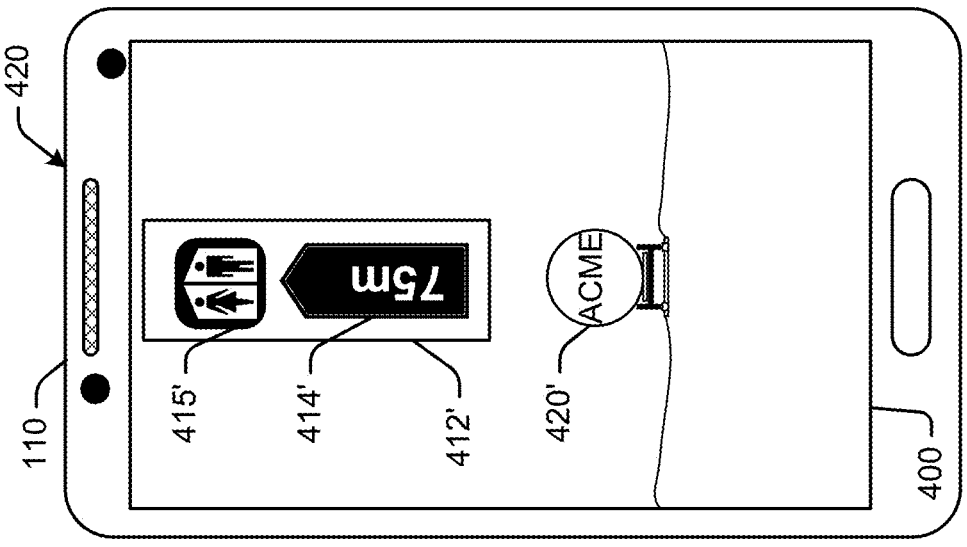
Figure 4C:
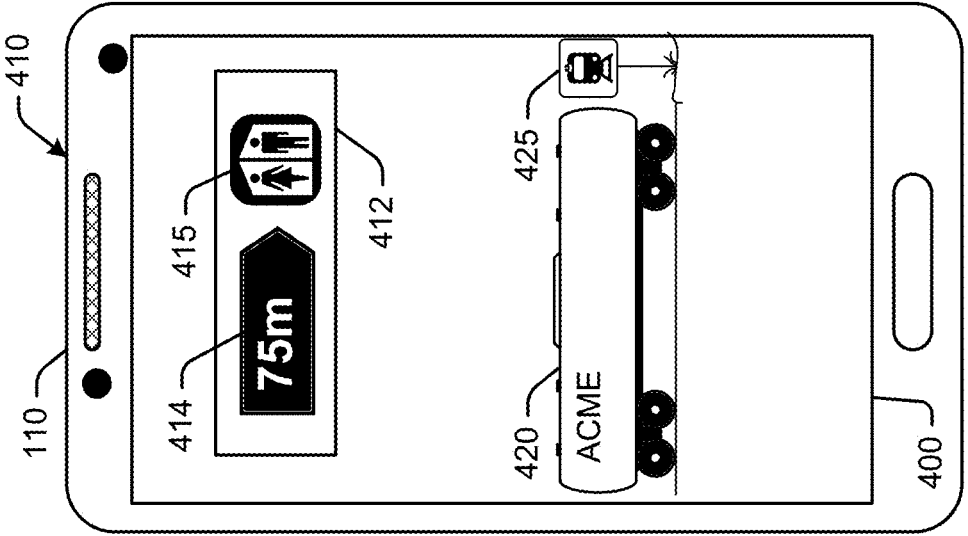

FIGS. 4A-C are example interfaces 410-430 illustrating output based on context during waypoint navigation. FIGS. 4A-C show output which may be generated in response to the user (e.g. user 101 in FIGS. 1 and 3) facing a marker or waypoint 420 from different orientations. The waypoint 420 is illustrated as being a train car, which may remain in a relatively fixed position at an outdoor railroad museum. For purposes of this illustration, the user is requesting directions to a restroom. In FIGS. 4A-C, the output is shown as it may be rendered on a display 400 of the mobile device 110.

In FIG. 4A, the user is facing a front side of the waypoint 420, as can be determined by the context. In this example, the sign 425 provides context for the waypoint 420. Other indicators may also be used to provide context. For example, the wording ACME appearing on one side of the railroad car (as shown in FIG. 4B) but not on the opposite side (not shown). In an example, the wording may appear at different relative locations on the different sides of the cars (e.g., as shown in FIGS. 4A and 4C). In an example where the sides are the same or similar (e.g., there are no distinguishing markings or other context that can be utilized), then logos may be affixed to the waypoint.

The waypoint navigator determine that the restrooms are 75 meters (m) to the right of the user, and these directions are overlaid on the image of the waypoint 420 as a visual direction 412 to the next waypoint. In an example, the visual direction 412 may include a vector 414 (i.e., a directional arrow with a magnitude of 75 m). The visual direction 412 may also include a representation 415 (e.g., graphical or photo image) of the next waypoint. In this example, the representation 415 is a sign outside the restrooms.

In an example, the visual direction is based on context of the image of the local waypoint, and may be updated based on changes in the context of the image of the local waypoint. By way of illustration, FIG. 4B shows an image of the waypoint 420' as it may be viewed from the left side (note that the sign is not visible, thus distinguishing between right and left sides). The waypoint navigator determine that the restrooms are now 75 m straight ahead of the user, and these directions are overlaid on the image of the waypoint 420' as a visual direction 412' (e.g., including vector 414' and representation 415') to the next waypoint.

By way of further illustration, FIG. 4C shows an image of the waypoint 420" as it may be viewed from the back side (note that the sign 425" is visible to the left of the train car, thus distinguishing between front and back sides). The waypoint navigator determine that the restrooms are now 75 m to the left of the user, and these directions are overlaid on the image of the waypoint 420" as a visual direction 412" (e.g., including vector 414" and representation 415") to the next waypoint.

Regardless of the user's orientation, the waypoint navigator are able to accurately provide directions to the next waypoint. The user may now proceed to the next waypoint, e.g., as illustrated with reference now to FIGS. 5A-B.

Figure 5B:
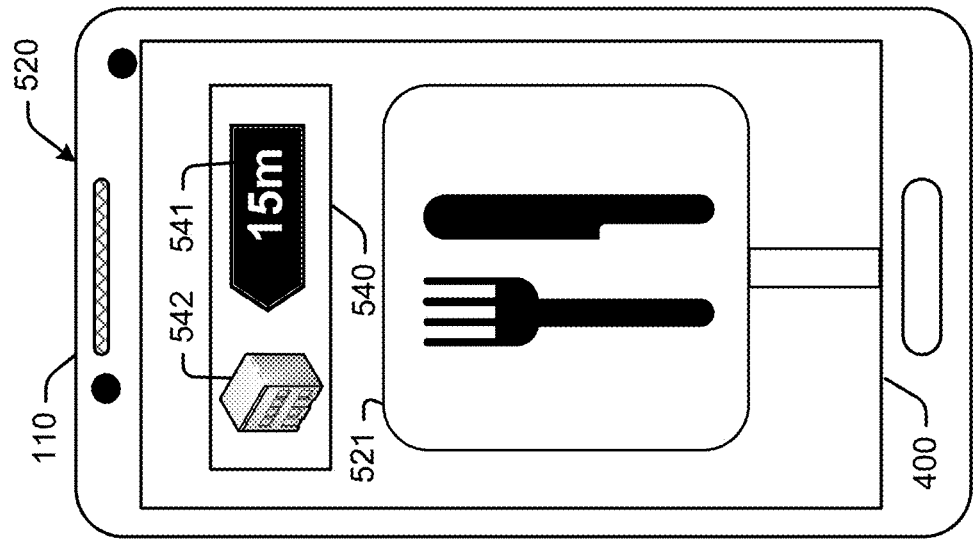
FIGS. 5A-B are example interfaces illustrating waypoint navigation between multiple waypoints.
Figure 5A:
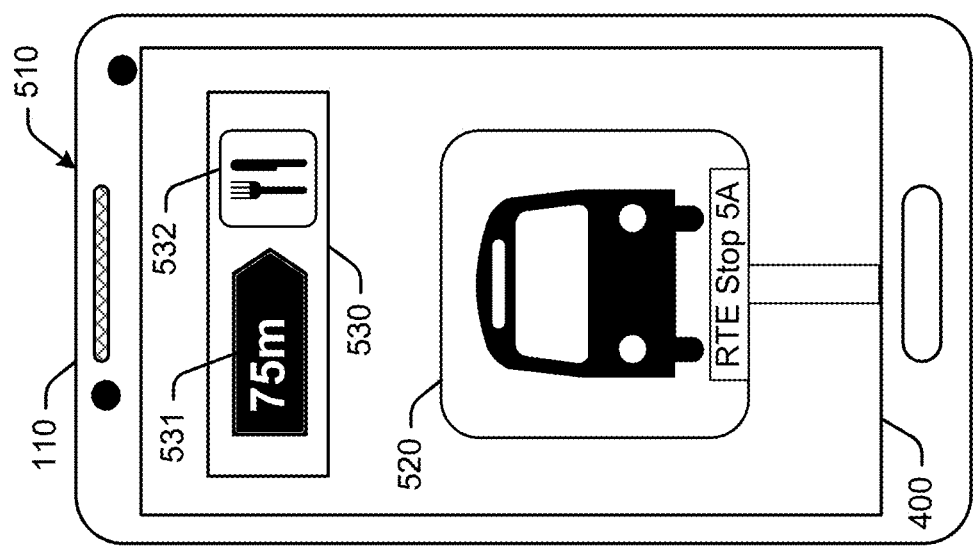

FIGS. 5A-B are example interfaces illustrating waypoint navigation between multiple waypoints. In this illustration, the user desires to visit a restaurant. The waypoint navigator may automatically suggest nearby restaurants to the user. In an example, suggestions may be based on the user's location, time-of-day, and/or habits (e.g., the user typically looks for a restaurant when getting off the bus at this stop during the noon hour). In an example, the user may request directions to restaurants (e.g., the closest restaurant, a type or category of restaurant, or a particular restaurant establishment).

In this illustration, the user has disembarked from the bus and captures an image of a sign 520 at the bus stop. The sign 520 is interpreted to be the waypoint. Based on the user's destination (e.g., as described above), the waypoint navigator determine that the next waypoint 521 (e.g., a restaurant sign) en route to the restaurant is 75 m to the right of the user, and these directions are overlaid on the image of the waypoint 520 as a visual direction 530 (e.g., including vector 531 and representation 532) to the next waypoint.

In an example, all or part of the visual direction 530 to the remote waypoint may be removed from the display 400 as the user moves between the local waypoint 520 and the remote waypoint 521. As such, the user is less likely to continue looking at the device 110, and instead focus on the physical surroundings where he or she is moving. In an example, the user may request to re-display the visual direction 530 to the remote waypoint when the user is between the local waypoint and the remote waypoint, e.g., as a reminder of what the user is looking for.

When the user reaches the waypoint 521, the user may again capture an image of the local waypoint 521. It is noted that in FIG. 5A, the sign 520 is considered the local waypoint and the sign 521 is considered the remote waypoint. In FIG. 5B, the sign 521 is considered the local waypoint, and building representation 542 is considered the remote (or in this example, the "destination") waypoint.

The waypoint navigator determine that the next waypoint 542 (e.g., the restaurant building) is 15 m to the left of the user, and these directions are overlaid on the image of the waypoint 521 as a visual direction 540 (e.g., including vector 541 and representation 542) to the restaurant building. Although not described again with reference to FIGS. 5A and 5B, it is noted that the waypoint navigator may use context of the image of the waypoint(s) to determine directions.

Figure 6:
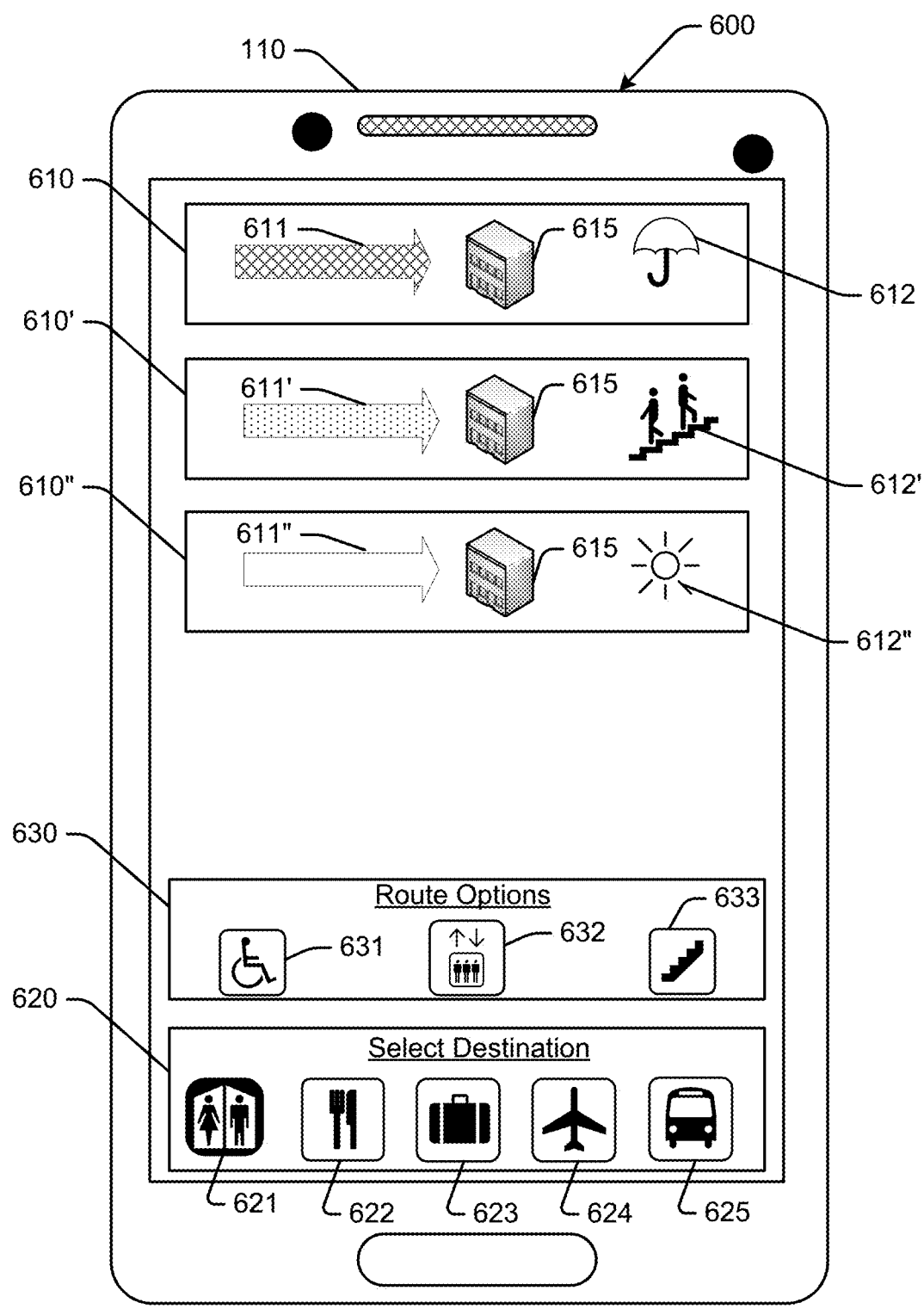
FIG. 6 is an example interface illustrating input and output for waypoint navigation.

FIG. 6 is example interface illustrating input and output for waypoint navigation. In an example, an indicator 610, 610' and/or 610" may be displayed as part of, or in addition to, the visual direction. Although all three indicators 610, 610' and 610" are shown in FIG. 6 for purposes of illustration, it is noted that only one of these may be shown at any given time, and the indicator (e.g., one of indicators 610, 610' and 610") may be overlaid on the image of the waypoint as illustrated in FIGS. 4A-C and 5A-B.

The indicator 610, 610' and/or 610" displayed on display 400 of device 110, may indicate to the user at least one condition between the local waypoint and the remote waypoint. As an example, the indicator may be a color of the visual direction. To illustrate, indicator 610 may include a red arrow 611 to indicate a long distance. Indicator 610' may include a yellow arrow 611' to indicate a medium distance. Indicator 610" may include a green arrow 611" to indicate a short distance. The color (or multiple colors) and/or other techniques may also designate other characteristics of the route and/or destination.

It is noted that the arrows 611, 611' and 611" may also include a distance (e.g., the arrows may be vectors). It is also noted that the definition of "long," "medium," and "short" may be predefined (e.g., based on generally accepted standards for the mode of transportation) and/or defined based on user input (e.g., user age or what the user considers to be a long, medium, and short distance).

The indicator 610, 610' and/or 610" is not limited to colored arrows, and may be any suitable output. For example, indicators 610, 610' and/or 610" are also shown each including a symbol (e.g., a graphical icon). To illustrate, indicator 610 may include an umbrella icon 612 to indicate the user may get wet en route to waypoint 615. Indicator 610' may include a stairs icon 612' to indicate the user may have to traverse steps en route to waypoint 615. Indicator 610" may include a sun icon 612" to indicate at least part of the route is outdoors. Other symbols may also be used, and the waypoint navigator is not limited to these examples.

In addition, the waypoint navigator may display a route option for the user. In an example, the waypoint navigator may enable the user to select from a menu of target waypoints. By way of illustration, the user may select a waypoint by selecting from various icons 620 shown on the display. An example which may be implemented at an airport includes restrooms icon 621, dining icon 622, luggage icon 623, airport terminal icon 624, and ground transportation icon 625. In an example, the waypoint navigator may enable the user to select route options 630, e.g., to include and/or exclude from the path. By way of illustration, handicap accessible route icon 631, elevator icon 632, and stairs icon 633 are illustrated in FIG. 6. Still other examples are contemplated.

Figure 7:
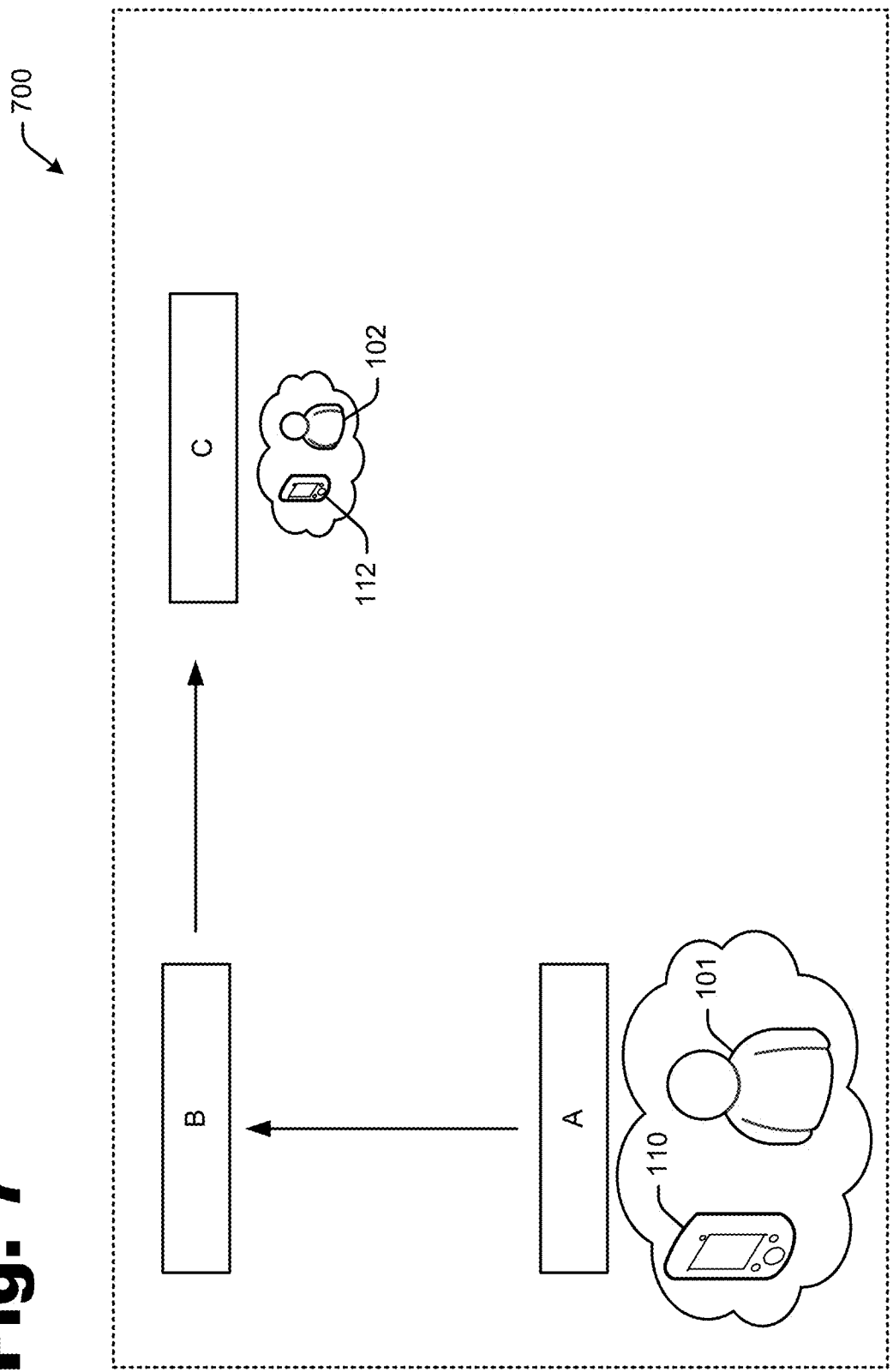
FIG. 7 is a high-level illustration showing an example of waypoint navigation to locate a person.

FIG. 7 is a high-level illustration 700 showing an example of waypoint navigation to locate a person. In this illustration, the user 101 desires to find user 102 (e.g., a co-worker at a tradeshow or convention) and navigate over to user 102. The user 101 may use the mobile device 110 to capture an image of the local waypoint A (e.g., a booth or sign at the tradeshow or convention). The waypoint navigator may process the image of the waypoint to identify the location and orientation of the user 101. For example, the waypoint navigator may identify a local waypoint A using image recognition on the image of the local waypoint A captured (and/or displayed) on the mobile device 110.

The waypoint navigator may access a database of other users (e.g., user 102, who has granted permission to be identified in the system) to locate the mobile device 112 of user 102. For example, the user 102 may have just received directions to waypoint C. The waypoint navigator may then overlay a visual direction to waypoint C on the image of the local waypoint (waypoint A) displayed on the mobile device 110 of user 101. In an example, the waypoint navigator may direct both users 101 and 102 to a rendezvous waypoint (e.g., halfway between the two users).

Figure 8:
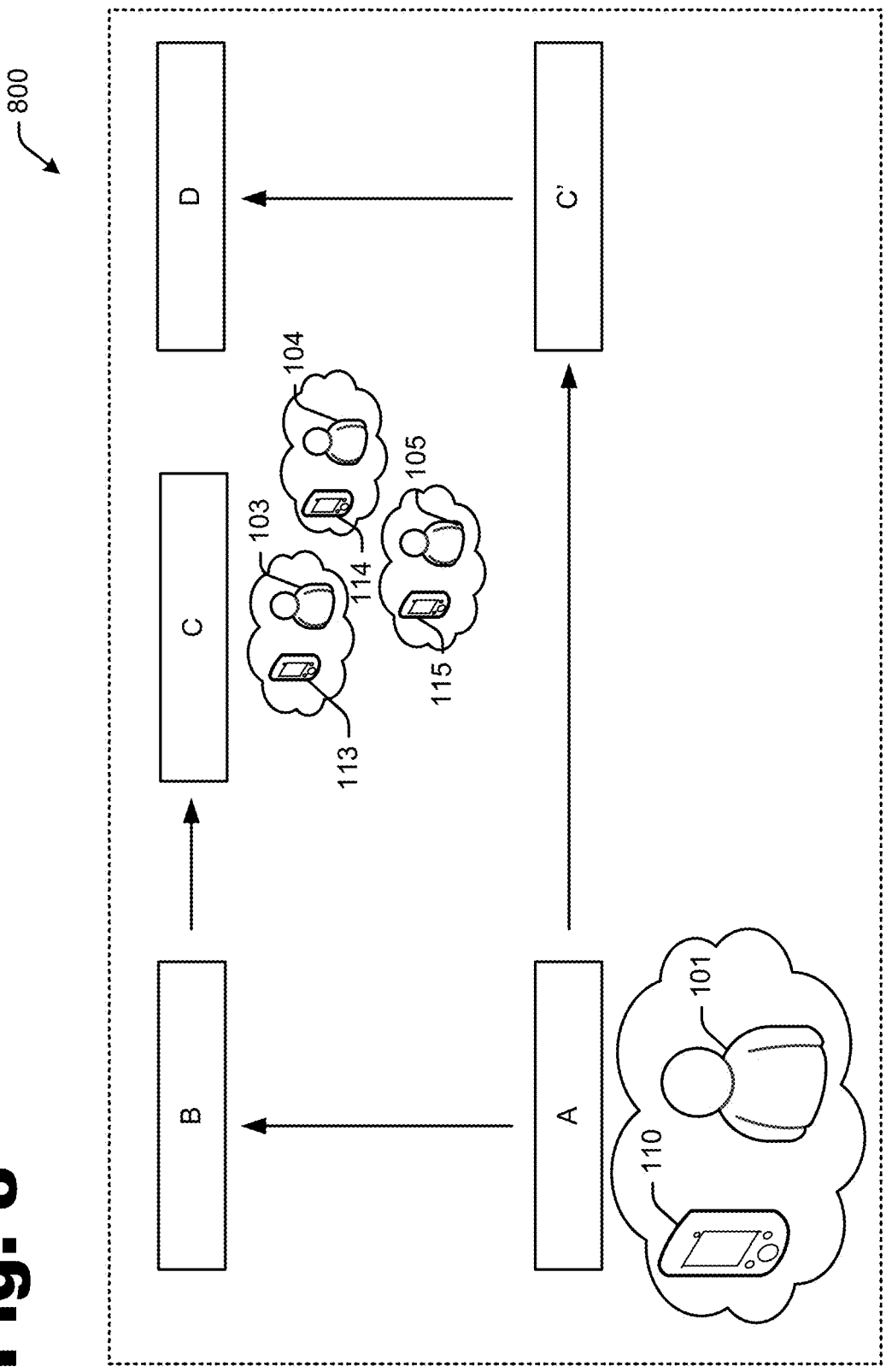
FIG. 8 is a high-level illustration showing an example of waypoint navigation to identify a preferred path.

FIG. 8 is a high-level illustration 800 showing an example of waypoint navigation to identify a preferred path. FIG. 8 shows an example of a high-density waypoint (waypoint C having users 103-105), which can indicate for example, popularity of the waypoint, or a crowd to be avoided.

In the illustration where the user desires to locate the popular nightclub (waypoint C), the user 101 may use the mobile device 110 to capture an image of the local waypoint A (e.g., a sign outside the restaurant where the user 101 just ate dinner). The waypoint navigator may process the image of the waypoint A to identify the location and orientation of the user 101. For example, the waypoint navigator may identify a local waypoint A using image recognition on the image of the local waypoint A captured (and/or displayed) on the mobile device 110.

The waypoint navigator may access a database of other users (e.g., users 103-105, who have granted permission to be identified in the system) to locate nightclub having the most mobile devices 113-115. For example, the users 113-115 may have just received directions to waypoint C, thus indicating their presence at waypoint C. The waypoint navigator may then overlay a visual direction to waypoint C on the image of the local waypoint (waypoint A) displayed on the mobile device 110 of user 101.

In the illustration where the user desires to avoid a crowd (waypoint C), such as a long line at an amusement park ride, the user 101 may use the mobile device 110 to capture an image of the local waypoint A (e.g., a sign at the ride the user just disembarked from). The waypoint navigator may process the image of the waypoint A to identify the location and orientation of the user 101. For example, the waypoint navigator may identify a local waypoint A using image recognition on the image of the local waypoint A captured (and/or displayed) on the mobile device 110.

The waypoint navigator may access a database of other users (e.g., users 103-105, who have granted permission to be identified in the system) to identify a long line based on the number of mobile devices 113-115 at waypoint C. For example, the users 113-115 may have just received directions to waypoint C, thus indicating their presence at waypoint C. A determination is made (e.g., by the user, or a suggestion by the system) to instead visit waypoint D (via waypoint C' to avoid the crowd at waypoint C). The waypoint navigator may then overlay a visual direction to waypoint D on the image of the local waypoint (waypoint A) displayed on the mobile device 110 of user 101.

Still other examples for implementing the waypoint navigator will become apparent to those having ordinary skill in the art after becoming familiar with the teachings herein, and thus are also considered to be a part of the disclosure.

Figure 9:
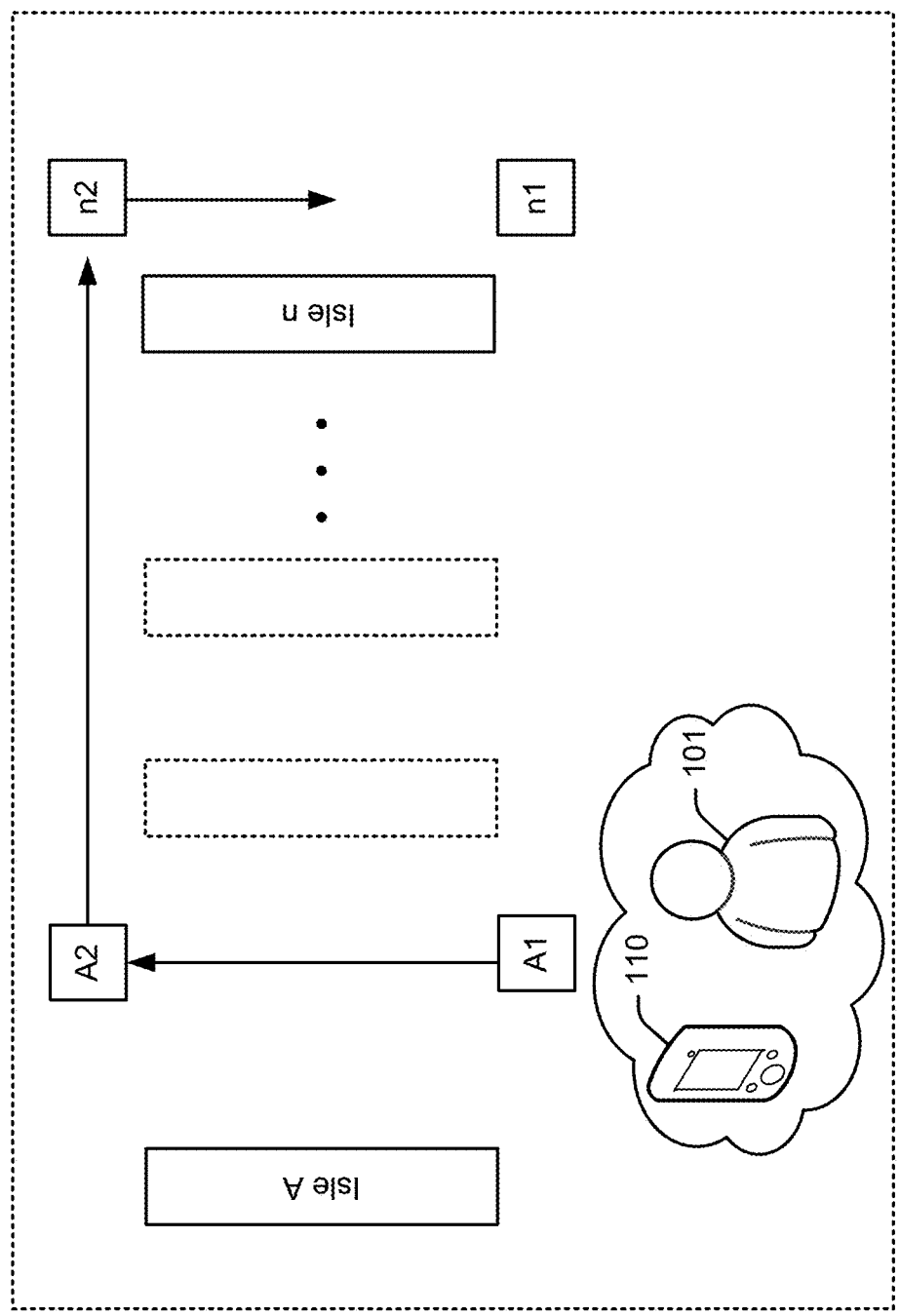
FIG. 9 is a high-level illustration showing an example of waypoint navigation at a retail location.

As another illustration, FIG. 9 shows an example of waypoint navigation at a retail location. In this illustration, the user 101 desires to find a product at the retail establishment. The user 101 may use the mobile device 110 to capture an image of the local waypoint A1 (e.g., a graphic on the floor or an isle sign). The waypoint navigator may process the image of the waypoint to identify the location and orientation of the user 101. For example, the waypoint navigator may identify a local waypoint A1 using image recognition on the image of the local waypoint A1 captured (and/or displayed) on the mobile device 110.

The waypoint navigator may access a database of products for sale at the retailer location to locate the product for the user 101. The waypoint navigator may then overlay a visual direction to the product on the image of the local waypoint (waypoint A1) displayed on the mobile device 110 of user 101. For example, directions may be rendered one waypoint at a time as the user moves via waypoint A2 and n2. The final directions may explain to the user that the product can be found in Isle n halfway between the sign or floor graphic "n2" and "n1". In an example, the floor graphic may include an image of the type of product that can be located in that isle (e.g., a hammer for a tool isle, or a plant for a garden isle).

Before continuing, it should be noted that the examples described above are provided for purposes of illustration, and are not intended to be limiting. Other devices and/or device configurations may be utilized to carry out the operations described herein.

Figure 10:
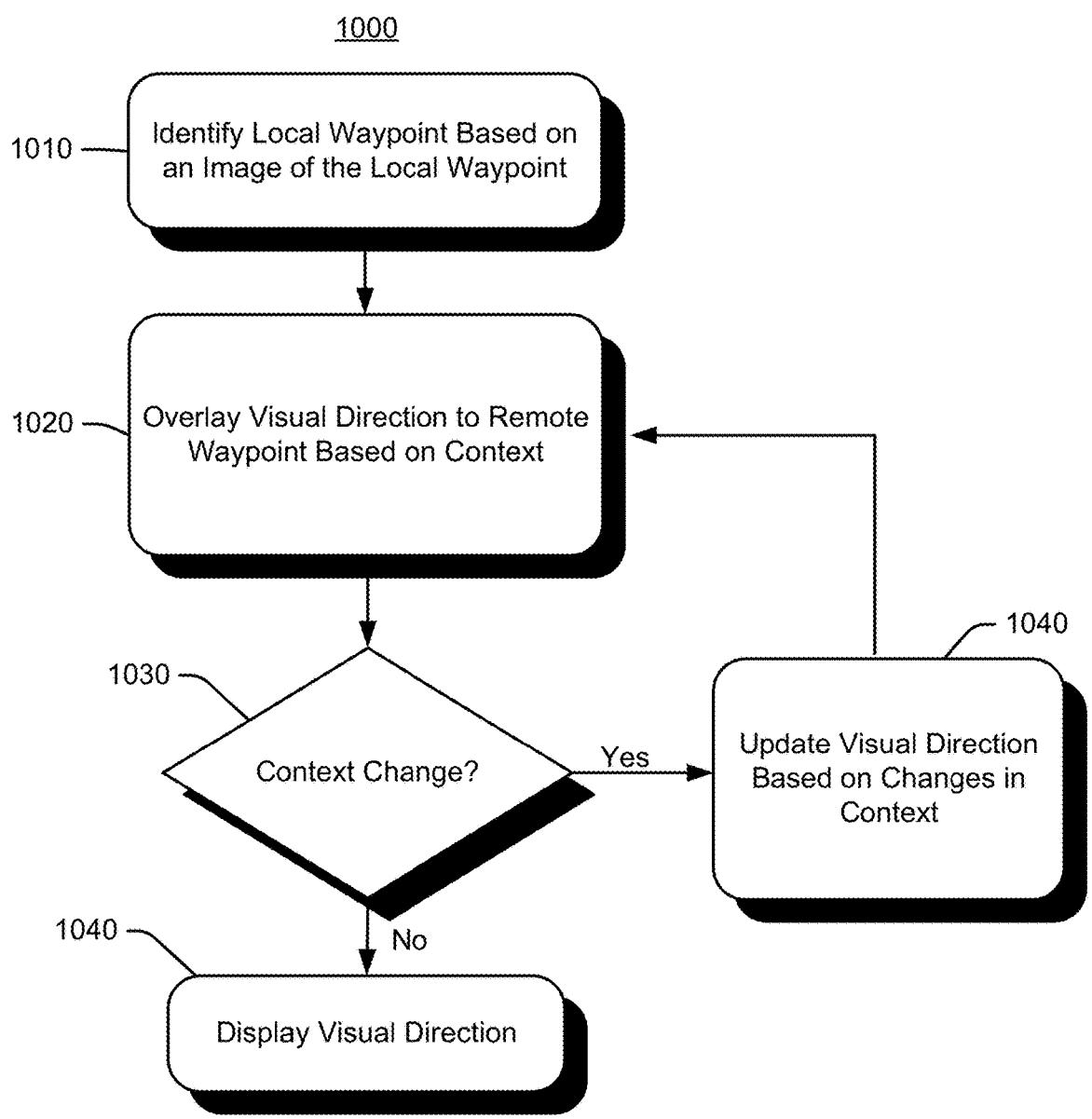

FIGS. 10-11 are flowcharts illustrating example operations which may implement waypoint navigation. The operations may be embodied as logic instructions on one or more non-transient computer-readable medium. When executed on a processor, the logic instructions cause a general purpose computing device to be programmed as a special-purpose machine that implements the described operations. In an example, the components and connections depicted in the figures may be used.

With reference to FIG. 10, operations 1000 illustrate an example method of waypoint navigation. Operation 1010 includes identifying a local waypoint, for example, using image recognition on an image of the local waypoint displayed on a mobile device. Operation 1020 includes overlaying a visual direction to a remote waypoint on the image of the local waypoint, based at least in part on identifying the local waypoint. In an example, the visual direction is based on context of the image of the local waypoint.

Operation 1030 includes determining whether there has been a change in context of the image. Context may be used to identify the direction a user is facing, for example as described above with reference to FIGS. 4A-C.

It is noted that change in context may include a change in local context (e.g., the user orientation relative to the local waypoint), a change in remote context (e.g., a different remote waypoint), and/or a change in route context (e.g., changing conditions along the way such as congestion). Any change in context may be used to force a recalculation by the waypoint navigator. It is noted that even if a waypoint is moving, the motion may be considered a context change and in an example, is recoverable if the waypoint navigator also has location and orientation information on the target waypoint.

If the context has changed, then operation 1040 includes updating the visual direction overlaid on the image based on the changes detected in the context of the image. For example, instead of an arrow pointing to the left, the arrow may now point to the right.

If the context has not changed, then operation 1050 includes displaying the visual direction. In an example, the visual direction may be displayed for a predetermined time. For example, the predetermined time may be a few seconds or a minute or a few minutes. In an example, the predetermined time is for a sufficient duration that the user is able to mentally process the image and directions, but not so long that the user is tempted to look at the display device instead of the physical surroundings as the user moves from one waypoint to another waypoint. In an example, the visual direction is only displayed so long as the mobile device does not detect movement, and is removed from the display when the mobile device detects movement. In another example, the visual direction may continue to be displayed, e.g., until the user "swipes" the display and/or the user reaches another waypoint.

In an example, other techniques may be applied to discourage the user from continuing to view the display while moving between waypoints. For example, the display may dim, a message may be displayed for the user to watch the physical surroundings, an audible message or sound may warn the user to watch the physical surroundings. Still other examples are also contemplated to discourage the user from continuing to view the display. The waypoint navigator is not limited to these examples, and may continue to display all or some of the interface while the user moves between waypoints, for example when there is little risk of the user viewing the display while moving between waypoint (e.g., while riding a bus or as a passenger giving the driver directions in a moving vehicle).

With reference to FIG. 11, operations 1100 illustrate an example method of waypoint navigation. Operation 1110 includes receiving input. Example input includes an image 1112 of a waypoint the user is standing at or near. Example input may also include user input 1114 (e.g., handicap accessible route preferences).

Operation 1120 includes identifying a local waypoint in the image 1112.

Operation 1130 includes identifying a remote waypoint. For example, the remote waypoint may be selected through user input 1132 and/or other input 1134 (e.g., preselected as part of a guided tour).

Operation 1140 includes determining context. Determining context in operation 1140 may be based on one or more of local, route, and/or remote context. Context may include local context. For example, context may be used to identify the direction a user is facing, as described above with reference to FIGS. 4A-C. Context may include route context (e.g., avoiding crowds, or the user requesting a handicap accessible route). Context may include remote context (e.g., context of a remote or destination waypoint).

Operation 1150 includes determining a route. The route may include intermediate waypoint(s) and/or a target waypoint. It is noted, however, that the waypoint navigator may display the next waypoint for the user without displaying a full mapping from point of origin to final destination.

Operation 1160 includes rendering a visual direction to the remote waypoint based on context of the image. In an example, the visual direction may include a vector (e.g., an arrow and distance) overlaid on the image. The remote waypoint may also be displayed (e.g., as an image or graphical rendering) next to the visual direction, as illustrated in FIGS. 5A-B.

The visual direction may be updated in operation 1170, and re-displayed in operation 1160 (via return 1180) if the context changes (e.g., as illustrated in FIGS. 4A-C). Updating in operation 1170 may be based on changes to one or more of local, route, and/or remote context.

The operations shown and described herein are provided to illustrate example implementations. It is noted that the operations are not limited to the ordering shown. Still other operations may also be implemented.

As shown and described herein, the operations may be implemented at least in part using an end-user interface (e.g., graphical user and/or web-based interface). In an example, the end-user is able to make predetermined selections, and the operations described above are implemented on a back-end device to present results to a user. The user can then make further selections. Various of the operations described herein may be automated or partially automated.

It is noted that the examples shown and described are provided for purposes of illustration and are not intended to be limiting. Still other examples are also contemplated.

The invention claimed is:

1. A computer-implemented method, comprising:
recognizing, by a computing system, in an image captured by a camera of a computing device, a local waypoint using an image recognition technique;
determining, by the computing system, based on the local waypoint captured on the image, a location and an orientation of a user operating the computing device;
generating, by the computing system, based on the local waypoint and a context, a visual direction to a remote waypoint;
updating, by the computing system, the visual direction based on changes in the context; and
removing, by the computing system, the visual direction to the remote waypoint as a user moves between the local waypoint and the remote waypoint.

2. The computer-implemented method of claim 1, wherein the context is at least one of a local context, a route context, or a remote context.

3. The computer-implemented method of claim 1, further comprising:
displaying, by the computing system, the remote waypoint along with the visual direction to the remote waypoint.

4. The computer-implemented method of claim 1, wherein the remote waypoint remains displayed as the user moves between the local waypoint and the remote waypoint.

5. The computer-implemented method of claim 1, further comprising:
redisplaying, by the computing system, upon a request of the user, as the user moves between the local waypoint and the remote waypoint, the visual direction to the remote waypoint.

6. The computer-implemented method of claim 1, further comprising:
providing an indicator to indicate a route information while navigating from the local waypoint to the remote waypoint.

7. The computer-implemented method of claim 6, wherein the route information includes at least one of a weather condition or a route condition.

8. A non-transitory computer-readable storage medium including instructions that, when executed by at least one processor of a computing system, cause the computing system to perform a method, comprising:
recognizing, in an image captured by a camera of a computing device, a local waypoint using an image recognition technique;
determining, based on the local waypoint captured on the image, a location and an orientation of a user operating the computing device;
generating, based on the local waypoint and a context, a visual direction to a remote waypoint;
updating the visual direction based on changes in the context; and
removing the visual direction to the remote waypoint as a user moves between the local waypoint and the remote waypoint.

9. The non-transitory computer-readable storage medium of claim 8, wherein the context is at least one of a local context, a route context, or a remote context.

10. The non-transitory computer-readable storage medium of claim 8, wherein the instructions, when executed by the at least one processor of the computing system, further cause the computing system to perform:
displaying the remote waypoint along with the visual direction to the remote waypoint.

11. The non-transitory computer-readable storage medium of claim 8, wherein the remote waypoint remains displayed as the user moves between the local waypoint and the remote waypoint.

12. The non-transitory computer-readable storage medium of claim 8, wherein the instructions, when executed by the at least one processor of the computing system, further cause the computing system to perform:
redisplaying, upon a request of the user, as the user moves between the local waypoint and the remote waypoint, the visual direction to the remote waypoint.

13. The non-transitory computer-readable storage medium of claim 8, wherein the instructions, when executed by the at least one processor of the computing system, further cause the computing system to perform:
providing an indicator to indicate a route information while navigating from the local waypoint to the remote waypoint.

14. The non-transitory computer-readable storage medium of claim 13, wherein the route information includes at least one of a weather condition or a route condition.

15. A system, comprising:
at least one processor; and
a memory storing instructions that, when executed by the at least one processor, cause the system to perform:
recognizing, in an image captured by a camera of a computing device, a local waypoint using an image recognition technique;
determining, based on the local waypoint captured on the image, a location and an orientation of a user operating the computing device;
generating, based on the local waypoint and a context, a visual direction to a remote waypoint;
updating the visual direction based on changes in the context; and
removing the visual direction to the remote waypoint as a user moves between the local waypoint and the remote waypoint.

16. The system of claim 15, wherein the context is at least one of a local context, a route context, and a remote context.

17. The system of claim 15, wherein the instructions, when executed by the at least one processor, further cause the system to perform:
displaying the remote waypoint along with the visual direction to the remote waypoint.

18. The system of claim 15, wherein the instructions, when executed by the at least one processor, further cause the system to perform:
redisplaying, upon a request of the user, as the user moves between the local waypoint and the remote waypoint, the visual direction to the remote waypoint.

19. The system of claim 15, wherein the instructions, when executed by the at least one processor, further cause the system to perform:
   providing an indicator to indicate a route information while navigating from the local waypoint to the remote waypoint.

20. The system of claim 19, wherein the route information includes at least one of a weather condition or a route condition.

* * * * *